(12) United States Patent
Ishida et al.

(10) Patent No.: US 11,506,534 B2
(45) Date of Patent: Nov. 22, 2022

(54) AUTOMATED ANALYSIS DEVICE

(71) Applicant: HITACHI HIGH-TECHNOLOGIES CORPORATION, Tokyo (JP)

(72) Inventors: Takeshi Ishida, Tokyo (JP); Isao Yamazaki, Tokyo (JP); Sakuichiro Adachi, Tokyo (JP); Shin Imamura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 785 days.

(21) Appl. No.: 16/472,129

(22) PCT Filed: Oct. 24, 2017

(86) PCT No.: PCT/JP2017/038296
§ 371 (c)(1),
(2) Date: Jun. 20, 2019

(87) PCT Pub. No.: WO2018/123236
PCT Pub. Date: Jul. 5, 2018

(65) Prior Publication Data
US 2019/0316963 A1 Oct. 17, 2019

(30) Foreign Application Priority Data
Dec. 27, 2016 (JP) .............................. JP2016-252913

(51) Int. Cl.
*G01J 3/10* (2006.01)
*G01J 3/02* (2006.01)
(Continued)

(52) U.S. Cl.
CPC ............... *G01J 3/10* (2013.01); *G01J 3/0216* (2013.01); *G01J 3/04* (2013.01); *G01N 21/255* (2013.01);
(Continued)

(58) Field of Classification Search
CPC .... G01J 3/10; G01J 3/0216; G01J 3/04; G01J 2003/045; G01N 21/272; G01N 21/64;
(Continued)

(56) References Cited

U.S. PATENT DOCUMENTS 4,451,433 A 5/1984 Yamashita et al.
2007/0160270 A1 7/2007 Arini et al.
(Continued)

FOREIGN PATENT DOCUMENTS

EP 2296392 A1 3/2011
EP 2330406 A1 6/2011
(Continued)

OTHER PUBLICATIONS

International Search Report for PCT/JP2017/038296, dated Mar. 16, 2011.
(Continued)

*Primary Examiner* — Dominic J Bologna
(74) *Attorney, Agent, or Firm* — Volpe Koenig

(57) ABSTRACT

An automatic analysis apparatus comprises: a light source generating light having a center wavelength equal to or shorter than 340 nm; a fluorescent substance excited by the light source light, and generates light together with transmitted light from the light source, having a wavelength of 340 nm to 800 nm; a condenser lens; at least one slit; a reaction cell holding a reaction solution where a specimen and reagent are mixed, and that the light source light and the light from the fluorescent substance enter; and a detector that detects light transmitted through the reaction cell. The light source, fluorescent substance, condenser lens, and slit are provided along a straight light corresponding to the optical axis. The width of the slit's opening is equal to or narrower than the width of a ray forming an image of the light source at the position of the slit.

8 Claims, 8 Drawing Sheets

(51) Int. Cl.
*G01J 3/04* (2006.01)
*G01N 21/27* (2006.01)
*G01N 21/64* (2006.01)
*G01N 21/25* (2006.01)

(52) U.S. Cl.
CPC ........... *G01N 21/272* (2013.01); *G01N 21/64* (2013.01); *G01J 2003/045* (2013.01); *G01N 2201/062* (2013.01)

(58) Field of Classification Search
CPC ............ G01N 2201/062; G01N 21/75; G01N 2201/0415; G01N 2201/0453; G01N 2201/061; G01N 21/253; G01N 21/255; G01N 35/00
See application file for complete search history.

(56) References Cited

U.S. PATENT DOCUMENTS

| | | | |
|---|---|---|---|
| 2009/0009760 A1 | 1/2009 | Kanayama et al. | |
| 2009/0201577 A1* | 8/2009 | LaPlante | G01N 21/6458 313/501 |
| 2011/0255090 A1 | 10/2011 | Harada et al. | |
| 2012/0135874 A1* | 5/2012 | Wang | C12Q 1/6844 435/5 |
| 2012/0177538 A1 | 7/2012 | Kanayama et al. | |
| 2016/0011115 A1* | 1/2016 | Chen | G01N 21/645 250/459.1 |

FOREIGN PATENT DOCUMENTS

| | | |
|---|---|---|
| JP | 2003-279481 A | 10/2003 |
| JP | 2008-002849 A | 1/2008 |
| JP | 5260903 B2 | 8/2013 |
| JP | 2015-087185 A | 5/2015 |
| JP | 2016-040528 A | 3/2016 |
| WO | 2010/012203 A1 | 2/2010 |
| WO | 2010/084627 A1 | 7/2010 |

OTHER PUBLICATIONS

European Search Report and Office Action dated Jul. 10, 2020 for the European Patent Application No. 17887042.4.

* cited by examiner

CROSS-SECTIONAL VIEW

TOP VIEW

AUTOMATED ANALYSIS DEVICE

TECHNICAL FIELD

The present invention relates to an automatic analysis apparatus.

BACKGROUND ART

Patent Literature 1 discloses an automatic analyzer to analyze quantities of ingredients included in a sample. For example, the automatic analyzer emits light from a light source on the sample or a reaction solution in which the sample and a reagent are mixed, and measures transmitted light quantity of single or plural measurement wavelengths transmitted through the sample or the reaction solution, with a photodetector. Then the automatic analyzer calculates absorbance from the measured light quantity, and obtains the quantities of ingredients from the relationship between the absorbance and the density. In the automatic analyzer, plural measurement wavelengths are required to deal with a large number of inspection items. Further, to realize high precision measurement, it is necessary to measure above a certain light quantity in all the wavelengths in a stable manner.

The wavelength of the light to be used differs by measurement object ingredient, however, the range of the wavelength is 340 nm to 800 nm. Conventionally, as a light source, a halogen lamp, which has a wide emission spectrum, and from which a comparatively large light quantity is obtained, has been used. However, the life of the halogen lamp is short (about 1000 hours), so that the halogen lamp has to be frequently changed. Further, in the halogen lamp, since it takes about 30 minutes before the light quantity becomes stable, the usability is lowered.

As an alternative light source for the halogen lamp, a configuration using plural single-wavelength LEDs corresponding to wavelengths used in analysis is given. Patent Literature 2 discloses a light source configuration to coaxially emit light from plural LEDs including an ultraviolet LED.

Further, Patent Literatures 3 to 5 disclose a configuration to combine light from a white light source such as a halogen lamp and ultraviolet light from an ultraviolet LED, with a filter or the like. In the halogen lamp, the quantity of ultraviolet light, especially light having a wavelength around 340 nm with high importance in the automatic analyzer, is small. Accordingly, the light is combined with light having ultraviolet light wavelength, with a filter or the like.

CITATION LIST

Patent Literature

[Patent Literature 1] U.S. Pat. No. 4,451,433
[Patent Literature 2] WO 2010/012203
[Patent Literature 3] Japanese Unexamined Patent Application Publication No. 2008-002849
[Patent Literature 4] Japanese Patent No. 5260903
[Patent Literature 5] Japanese Unexamined Patent Application Publication No. 2016-040528

SUMMARY OF INVENTION

Technical Problem

The reagent to be used differs in accordance with measurement object and the light wavelength to be used differs in accordance with reagent. As a measuring method, a technique of quantifying the density of measurement object with high accuracy by simultaneously measuring two wavelengths lights, i.e. so-called dual wavelength measuring method, is known. This measuring method is performed on the presumption that in the respective wavelength lights, the optical axis and the light quantity distribution correspond with each other with respect to the reaction solution. When they do not correspond with each other, the original effect of the dual wavelength measuring method is not obtained. For example, when the dual wavelength measuring method is performed by using two wavelengths lights with the optical axes or light quantity distributions not corresponding with each other, the measurement is susceptible to disturbance such as bubbles in comparison with a case where they correspond with each other, and the precision or the accuracy is lowered.

When the dual wavelength measuring method is to be performed by using the light source in Patent Literatures 2 to 5 as an alternative to the halogen lamp, there is a possibility that the difference in optical axis and light quantity distribution of the lights from the plural light sources is increased with respect to the reaction solution, and the precision or the accuracy is lowered. The techniques in Patent Literatures 2 to 5 have a problem that it is very difficult to reduce the difference in optical axis and light quantity distribution of the lights from the plural light sources.

Accordingly, regarding lights having respective wavelengths used in measurement, the present invention provides an automatic analysis apparatus capable of reducing the difference in optical axis and light quantity distribution.

Solution to Problem

For example, to solve the above-described problems, the configurations described in the claims are adopted. The present invention includes plural solutions to the above-described problems. As one example, provided is an automatic analysis apparatus comprising: a light source that generates light having a center wavelength equal to or shorter than 340 nm; a fluorescent substance that is excited with the light of the light source to emit light, and that generates light, together with transmitted light from the light source, having a wavelength of 340 nm to 800 nm; a condenser lens; at least one slit; a reaction cell, that holds a reaction solution in which a specimen and a reagent are mixed, and that the light from the light source and the light from the fluorescent substance enter; and a detector that detects light transmitted through the reaction cell. The light source, the fluorescent substance, the condenser lens, and the slit are provided along a straight line corresponding to an optical axis, and the width of an opening of the slit is equal to or narrower than the width of a ray forming an image of the light source at the position of the slit.

Advantageous Effects of Invention

According to the present invention, regarding lights having respective wavelengths used in measurement, it is possible to reduce the difference in optical axis and light quantity distribution. Further features of the present invention will be apparent from the following description taken in conjunction with the accompanying drawings. Note that other objects, the features and advantages of the present invention than those described above may be clearer with the following detailed description.

DESCRIPTION OF EMBODIMENTS

Hereinbelow, embodiments of the present invention will be described with reference to the attached drawings. The attached drawings show concrete embodiments along the principle of the present invention. However, they are used for understanding of the present invention, but not used for limited interpretation of the present invention.

The following embodiments relate to an analysis apparatus to analyze quantities of ingredients included in a specimen. For example, the embodiments relate to an automatic analysis apparatus to analyze quantities of ingredients included in blood or urine. In the following description, an automatic analysis apparatus having a light source configuration, using plural light sources, capable of reducing the difference in optical axis and light quantity distribution of the light sources, is disclosed.

First Embodiment

Figure 1:
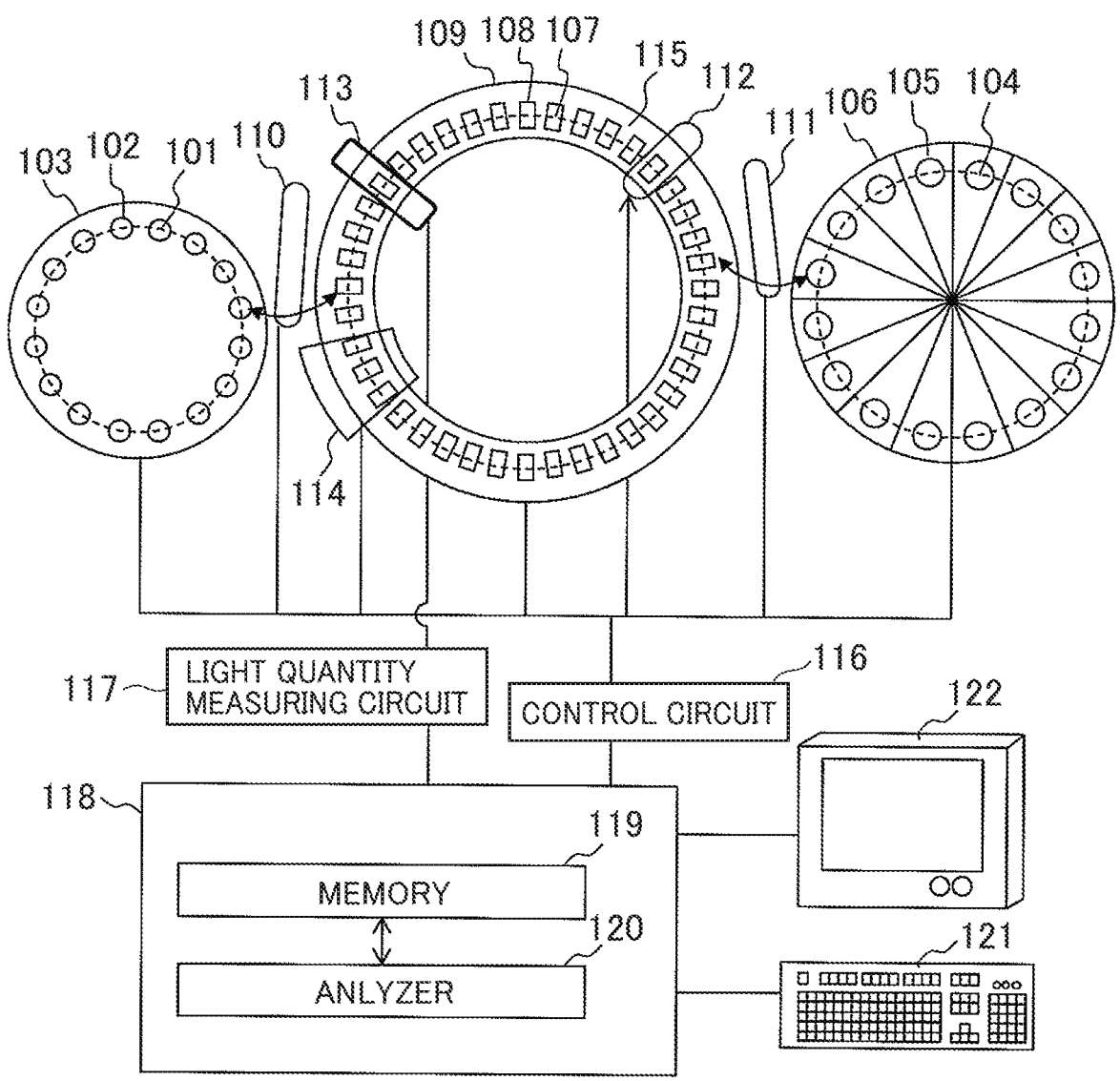
FIG. 1 is a schematic diagram showing an example of the entire configuration of an automatic analysis apparatus according to a first embodiment.

FIG. 1 shows an example of an entire configuration of an automatic analysis apparatus according to a first embodiment. The automatic analysis apparatus according to the present embodiment has three types of discs, a dispensing mechanism to move a specimen (sample) and a reagent among these three types of discs, a control circuit 116 to control a disc driver and the dispensing mechanism, a measuring unit (absorptiometer) 113 to measure the light quantity of single or plural measurement wavelengths transmitted through a reaction solution in which the specimen and the reagent are mixed, a light quantity measuring circuit 117 to measure absorbance from the light quantity measured with the measuring unit 113, a data processor 118 to process the data measured with the light quantity measuring circuit 117, and an input unit 121 and output unit 122 as an interface with respect to the data processor 118. The three types of discs are a sample disc 103, a reagent disc 106, and a reaction disc 109. Further, the dispensing mechanism has a sample dispensing mechanism 110 and a reagent dispensing mechanism 111.

The data processor 118 has a memory 119 and an analyzer 120. The memory 119 holds control data, measurement data, data used for data analysis, analysis result data, and the like. The data processor 118 may be realized by using a computer. The computer has at least a processor such as a CPU (Central Processing Unit) and the memory 119. The processing with the analyzer 120 may be realized by storing program code corresponding to these processings in the memory 119 and executing the respective program code with the processor.

The input unit 121 and output unit 122 perform data input/output with respect to the memory 119. In the example of FIG. 1, the input unit 121 is a keyboard. However, the unit may be another input device such as a touch panel, ten keys or the like. The output unit 122 is a device used for checking an analysis result by the user. For example, it is a display.

On the circumference of the sample disc 103, plural sample cups 102 are provided as containers of the sample 101. The sample 101 is e.g. blood. On the circumference of the reagent disc 106, plural reagent bottles 105 are provided as containers of the reagent 104. On the circumference of the reaction disc 109, plural reaction cells 108 are provided as containers of the reaction solution 107 in which the sample 101 and the reagent 104 are mixed.

The sample dispensing mechanism 110 is a mechanism to move the sample 101 from the sample cups 102 to the reaction cell 108 by a certain amount. The sample dispensing mechanism 110 has, e.g., a nozzle to discharge or suck a solution, a robot to move the nozzle for positioning of the nozzle in a predetermined position, and a pump to discharge or suck the solution from the nozzle or to the nozzle.

The reagent dispensing mechanism 111 is a mechanism to move the reagent 104 from the reagent bottle 105 to the reaction cell 108 by a certain amount. The reagent dispensing mechanism 111 has, e.g., a nozzle to discharge or suck a solution, a robot to move the nozzle for positioning of the nozzle in a predetermined position, and a pump to discharge or suck the solution from the nozzle or to the nozzle.

The stirring unit 112 is a mechanism to stir the sample 101 and the reagent 104 to mix them in the reaction cell 108. The cleaning unit 114 is a mechanism to discharge the reaction solution 107 from the reaction cell 108 after completion of analysis processing, then clean the reaction cell 108. Note that after the cleaning of the reaction cell 108, the sample dispensing mechanism 110 dispenses the next sample 101 into the reaction cell 108 after the cleaning, and the reagent dispensing mechanism 111 dispenses new reagent 104 into the reaction cell 108. In this manner, the reaction cell 108 after the cleaning is used for other reaction processing.

In the reaction disc 109, the reaction cell 108 is immersed in the constant-temperature fluid 115 in a constant-temperature bath at controlled temperature and flow rate. Accordingly, the reaction cell 108 and the reaction solution 107 in the cell are maintained at a constant temperature even while they are moved with the reaction disc 109. In the case of the present embodiment, water is used as the constant-temperature fluid 115, and the temperature is controlled at 37±0.1° C. with the control circuit 116. It goes without saying that the medium and temperature of the medium used as the constant-temperature fluid 115 are an example and not limited to the above medium and the temperature. Further, the measuring unit 113 is provided at a part on the circumference of the reaction disc 109.

Figure 2:
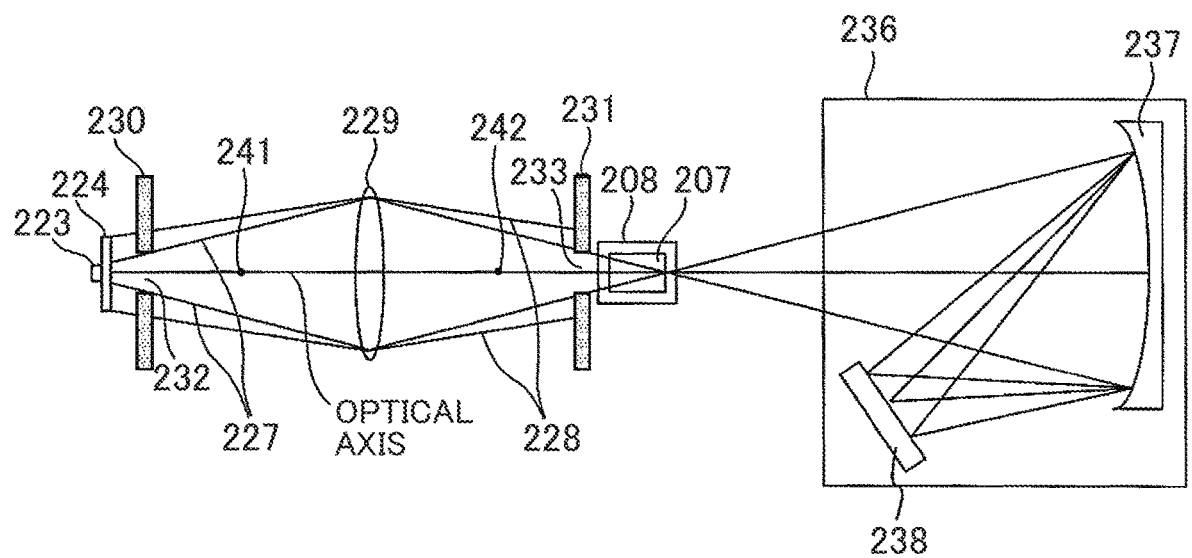
FIG. 2 is a schematic diagram showing an example of the configuration of an absorbance measuring unit of the automatic analysis apparatus according to the first embodiment.

FIG. 2 is a schematic diagram showing an example of the configuration of the measuring unit 113 in the automatic analysis apparatus according to the first embodiment. The measuring unit 113 has an ultraviolet LED light source (light emitting diode) 223, a fluorescent substance 224, a condenser lens 229, a first slit 230, a second slit 231, a spectroscope 236, and a detector array 238.

The ultraviolet LED light source 223 is a light source to generate light having e.g. a central wavelength equal to or shorter than 340 nm. The fluorescent substance 224 is provided in the vicinity of the ultraviolet LED light source 223. The fluorescent substance 224 is excited with light from the ultraviolet LED light source 223 to emit light, and generates light, together with the transmitted light from the LED light source 223, having a wavelength of 340 nm to 800 nm. The ultraviolet LED light source 223, the fluorescent substance 224, the condenser lens 229, the first slit 230, and the second slit 231 are provided along a straight line corresponding to the optical axis.

Figure 3:
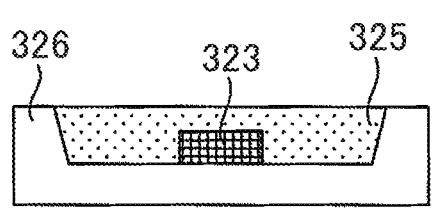
FIG. 3 is a diagram showing an example of configurations of an ultraviolet LED light source and a fluorescent substance according to the first embodiment.
Figure 3:
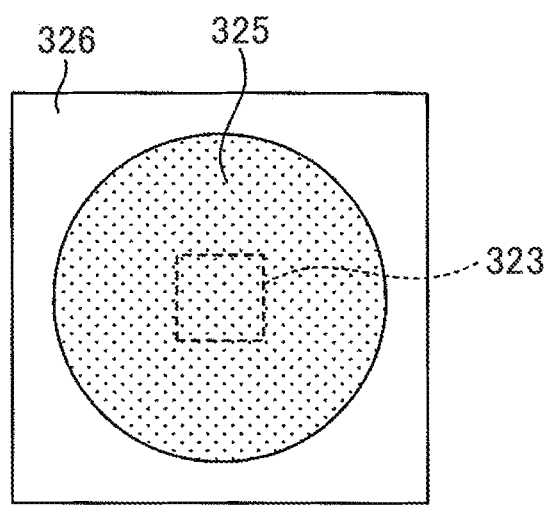

FIG. 3 is a cross-sectional diagram and a top view showing configurations of the ultraviolet LED light source and the fluorescent substance. The measuring unit 113 includes an ultraviolet LED light source 323, sealing resin 325, and a package 326. The form of the fluorescent substance according to the present example is the sealing resin 325 including fluorescent substance. The sealing resin 325 is sealing resin to protect the ultraviolet LED light source 323, and in which a fluorescent substance is mixed. In the present example, the ultraviolet LED light source 323 and the sealing resin 325 including fluorescent substance are accommodated in the same package 326. However, the ultraviolet LED light source and the member including the fluorescent substance may be configured with independent members. For example, when the life of the ultraviolet LED light source and that of the fluorescent substance are different, it is preferable that they are configured with different members and they are independently changed. An example where the ultraviolet LED light source and the member including the fluorescent substance are configured with different members will be described later.

In the present embodiment, a light emitting part of the ultraviolet LED light source 323 is 1 mm square in size. Further, the diameter of a light emitting surface of the sealing resin 325 including the fluorescent substance is 4 mm. The size of the package 326 is 5×5×1.2 mm. As a resin material, transparent silicon resin or transparent fluorine resin may be used.

In FIG. 2, the light generated in the ultraviolet LED light source 223 excites the fluorescent substance 224, and a part of the light is transmitted through the fluorescent substance 224. Light 227 of the ultraviolet LED light source is indicated as a ray that emits from an end of the ultraviolet LED light source 223 and passes through an end of the condenser lens 229. Actually, an infinite number of rays exist between the ray described as the light 227 of the ultraviolet LED light source 223 and the optical axis.

In the present embodiment, as the ultraviolet LED light source 223, a surface-mount LED having a central wavelength of 340 nm±5 nm, and a spectrum half width of 25 nm, is used. The light from the excited fluorescent substance 224 indicates an emission spectrum unique to the configured material. The material configuring the fluorescent substance 224 may be selected so as to obtain light having a wavelength used in measurement.

As examples of the wavelength used in measurement, 340 nm, 376 nm, 405 nm, 415 nm, 450 nm, 480 nm, 505 nm, 546 nm, 570 nm, 600 nm, 660 nm, 700 nm, 750 nm, and 800 nm are given. In the present embodiment, 12 wavelengths, 340 nm, 405 nm, 450 nm, 480 nm, 505 nm, 546 nm, 570 nm, 600 nm, 660 nm, 700 nm, 750 nm, and 800 nm are used in measurement. Among the above 12 wavelengths, lights having other wavelengths than 340 nm are obtained with light emission of the fluorescent substance 224. Since it is impossible to obtain a wide emission spectrum for 11 wavelengths with one type of fluorescent substance, it is necessary to use two or more fluorescent substances. In the present embodiment, $Sr_3(PO_4)_2$:Eu as a violet fluorescent substance, $BaMg_2Al_{16}O_{27}$:Eu, Mn as a blue fluorescent substance, $3.5MgO \cdot 0.5MgF_2 \cdot GeO_2$:Mn and $Gd_3Ga_5O_{12}$:Cr as a red fluorescent substance are used. The combination of the fluorescent substances is not limited to this combination, but it is possible to obtain a desired emission spectrum by arbitrarily selecting necessary type from various luminescent color fluorescent substances shown in Table 1.

TABLE 1

| Composition | Luminescent color | Peak wavelength |
|---|---|---|
| $SrB_4O_7$:Eu | ultraviolet | 371 |
| $NaSrBO_3$:Ce | violet | 400 |
| $Sr_2SiO_4$:Ce,Li | violet | 405 |
| $(Sr,Mg)_2P_2O_7$:Eu | violet | 420 |
| $Sr_3(PO_4)_2$:Eu | violet | 420 |
| $SrAl_{12}O_{19}$:Eu | violet | 420 |
| $CaAl_2O_4$:Eu,Nd | blue | 440 |
| $Ba_3MgSi_2O_8$:Eu | blue | 440 |
| $(Ca,Sr,Ba,Mg)_5(PO_4)_3Cl$:Eu | blue | 447 |
| $BaMgAl_{10}O_{17}$:Eu | blue | 447 |
| $Sr_{10}(PO_4)_6Cl_2$:Eu | blue | 447 |
| $(Sr,Ba)Si_9Al_{19}ON_{31}$:Eu | blue | 450 |
| $BaMgAl_{14}O_{23}$:Ru | blue | 450 |
| $BaMg_2Al_{16}O_{27}$:Eu,Mn | blue | 450 |
| $(Ca,Sr)_5(PO_4)_3Cl$:Eu,Mn | blue | 450 |
| $(Sr,Ba)_3MgSi_2O_8$:Eu | blue | 450 |
| ZnS:Ag | blue | 450 |
| $CaMgSi_2O_6$:Eu | blue | 450 |
| $Sr_2MgSi_2O_7$:Eu | blue | 467 |
| $Sr_2SiO_4$:Eu | blue | 469 |
| $(Sr,Ba)_5(PO_4)_3Cl$:Eu | cyan | 476 |
| $BaZrSi_3O_9$:Eu | cyan | 479 |
| $(Ba,Ca,Mg,Sr)_{10}(PO_4)_6Cl_2$:Eu | cyan | 480 |
| $2SrO \cdot 0.84P_2O_5 \cdot 0.16B_2O_3$:Eu | cyan | 480 |
| $LaAl(SiAl)_6N_9O$:Ce | blue green | 490 |
| $Ca_9Gd(PO_4)_7$:Eu,Mn | blue green | 490 |
| $Sr_4Al_{14}O_{26}$:Eu,Dy | blue green | 490 |
| $Sr_2Si_3O_8 \cdot 2SrCl_2$:Eu | blue green | 490 |
| $SrGa_2S_4$:Ru | green | 500 |
| ZnO:Zn | green | 510 |
| $BaMgAl_{10}O_{17}$:Eu,Mn | green | 515 |
| $BaMg_2Al_{16}O_{27}$:Eu,Mn | green | 515 |
| $SrAl_2O_4$:Eu,Dy | green | 520 |
| $Lu_3Al_5O_{12}$:Ce | green | 520 |
| $Ba_3Si_6O_{12}N_2$:Eu | green | 525 |
| $(Ba,Sr,Mg,Ca)_2SiO_4$:Eu,Mn | green | 529 |
| ZnS:Cu,Al | green | 530 |
| $Ca_5(PO_4)_2SiO_4$:Eu | green | 530 |
| ZnS:Cu | green | 534 |
| $SrGa_2S_4$:Eu | green | 535 |
| $Zn_2GeO_4$:Mn | green | 540 |
| $SrSi_2N_2O_2$:Eu | green | 542 |
| $Y_2SiO_5$:Ce,Tb | green | 544 |
| $(Y_a,Gd_{1-a})_3(Al_b,Ga_{1-b})_5O_{12}$:Ce | green | 555 |
| $(Sr,Ca)_2SiO_4$:Eu | yellowish green | 576 |
| $Sr_{1.9-x}Ba_xEu_{0.05}Li_{0.06}MoO_6$ | orange | 596 |
| $Y_2O_3$:Ru | orange | 600 |
| $Ca_3Si_2O_7$:Eu | orange | 600 |
| $Ba_2Si_5N_8$:Eu | red | 611 |
| $LiEuW_2O_8$ | red | 615 |
| $LiEu(WO_4)_{2-x}(MoO_4)_x$ | red | 615 |

TABLE 1-continued

| Composition | Luminescent color | Peak wavelength |
|---|---|---|
| $(Sr,Mg)_3(PO_4)_2$:Sn | red | 620 |
| $Y(P,V)O_4$:Eu | red | 620 |
| $La_2O_2S$:Eu | red | 624 |
| $Sr_2Si_5N_8$:Eu | red | 625 |
| $Y_2O_2S$:Eu | red | 626 |
| $Gd_2O_2S$:Eu | red | 626 |
| $(Sr,Ca)AlSiN_3$:Eu | red | 630 |
| $CaAlSiN_3$—$Si_2N_2O$:Eu | red | 640 |
| $Ca_9Gd(PO_4)_7$:Eu,Mn | red | 645 |
| $CaAlSiN_3$:Eu | red | 648 |
| $CaAl_{1+x}Si_{1-x}N_{3-x}O_x$:Eu | red | 650 |
| $3.5MgO\cdot 0.5MgF_2\cdot GeO_2$:Mn | red | 660 |
| $(Zn,Cd)S$:Ag,Cl | red | 673 |
| $SrSc_2O_4$:Eu | red | 687 |
| $(Y,Gd)_3(Al,Ga)_5O_{12}$:Cr | red | 700, 730 |
| $Gd_3Ga_5O_{12}$:Cr | red | 730 |
| $LiAlO_2$:Fe | red | 735 |
| $Ba_3MgSi_2O_8$:Eu,Mn | multicolor | 442, 505, 620 |
| $Ca_{8(1-x)}Mg_{1-y}La(PO_4)_7$:$x$Eu,$y$Mn | multicolor | 515, 610 |
| $Ca_{6-x-y}Mg_{x-z}(PO_4)_4$:Eu$_y$,Mn$_z$ | multicolor | 445, 625 |

Figure 4:
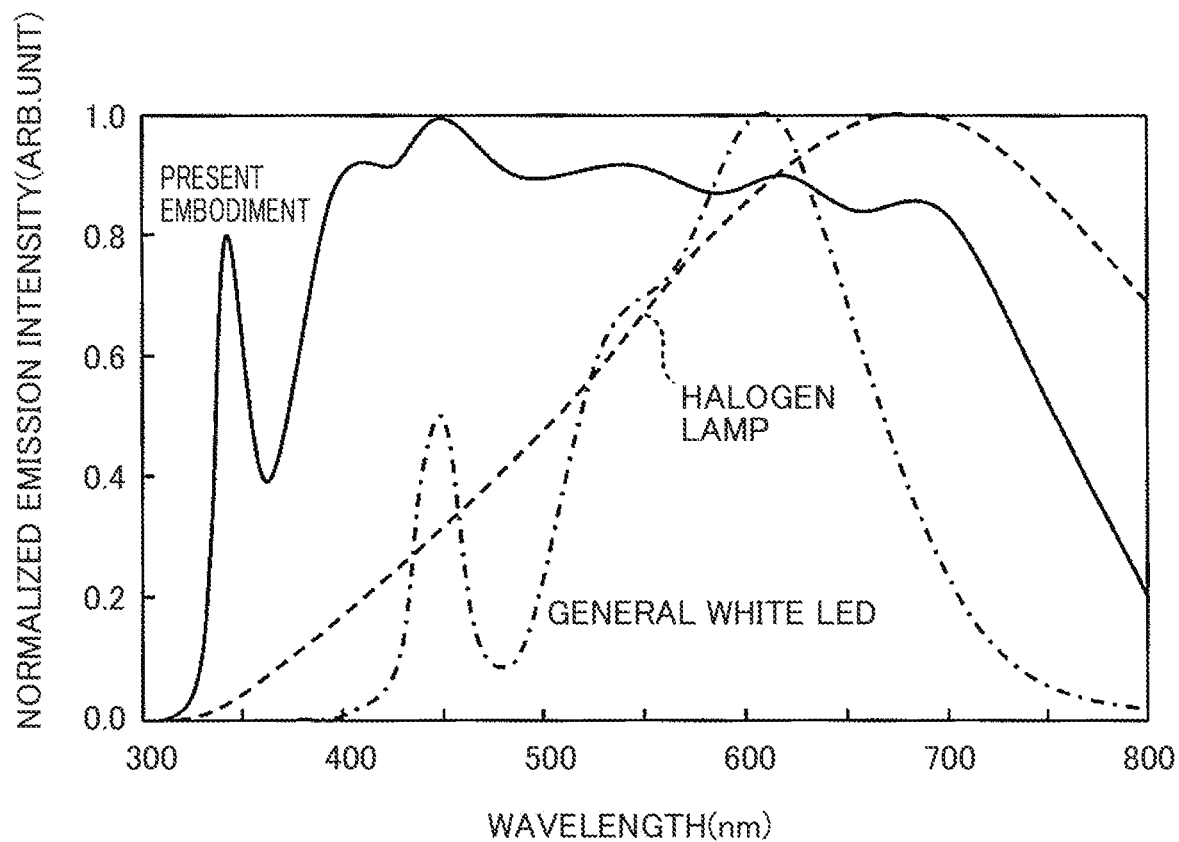
FIG. 4 is a diagram showing a spectrum of light from the ultraviolet LED light source and the fluorescent substance according to the first embodiment.

FIG. 4 is a diagram showing a spectrum of light from the ultraviolet LED light source and fluorescent substance according to the present embodiment. As comparison objects, a spectrum of a general halogen lamp and a spectrum of a general white LED are shown. The vertical axis is normalized with the maximum emission intensity as 1. As the general white LED, an LED in which a YAG fluorescent substance $((Y_a,Gd_{1-a})_3(Al_b,Ga_{1-b})_5O_{12}$:Ce) is excited with an InGaN 450 nm blue light is given. It is understood that the emission spectrum from the ultraviolet LED light source 223 and the fluorescent substance 224 according to the present embodiment is a very wideband spectrum in comparison with the general white LED. Further, regarding the emission spectrum from the ultraviolet LED light source 223 and the fluorescent substance 224 according to the present embodiment, in comparison with the halogen lamp, there is a difference in wavelength range with high emission intensity and in intensity range with low emission intensity, however, there is no problem as long as the emission intensity is higher than emission intensity required for measurement.

In FIG. 2, the light 227 of the ultraviolet LED light source and the light 228 of the fluorescent substance are condensed with the condenser lens 229, and emitted on the reaction cell 208 holding the reaction solution 207. Note that the light 228 of the fluorescent substance is indicated as a ray when a first slit 230 to be described later does not exist. Further, the light 228 of the fluorescent substance is indicated as a ray emitted from an end of the fluorescent substance 224 and passes through an end of the condenser lens 229. Actually, an infinite number of rays exist between the line indicated as the light 228 of the fluorescent substance and the optical axis.

In FIG. 2, the first slit 230 is provided between a front focal point 241 of the condenser lens 229 and the fluorescent substance 224, such that light quantity distribution of the light from the ultraviolet LED light source 223 to be irradiated on the reaction cell 208 is relatively coincident with light quantity distribution of the light from the fluorescent substance 224 in the radiation surface. The width of an opening 232 of the first slit 230 is equal to or narrower than the width of the ray forming the image of the ultraviolet LED light source 223 at the position of the first slit 230. The first slit 230 blocks the ray forming the image of the fluorescent substance 224 outside of the ray forming the image of the ultraviolet LED light source 223.

Further, the second slit 231 is provided between a rear focal point 242 of the condenser lens 229 and the reaction cell 208. The width of an opening 233 of the second slit 231 is equal to or narrower than the width of a ray forming the image of the ultraviolet LED light source 223 at the position of the second slit 231. The second slit 231 blocks the ray forming the image of the fluorescent substance 224 outside of the ray forming the image of the ultraviolet LED light source 223.

In the above-described configuration, the closer the first slit 230 is to the fluorescent substance 224, the higher the effect of blocking the ray forming the image of the fluorescent substance 224 outside of the ray forming the image of the ultraviolet LED light source 223 is. Further, the difference between the light quantity distribution of the light from the ultraviolet LED light source 223 and that of the light from the fluorescent substance 224, emitted on the reaction cell 208, in the irradiation surface, is reduced. Accordingly, the first slit 230 may be integrated with the fluorescent substance 224 or a member holding the fluorescent substance 224.

Further, the closer the second slit 231 is to the reaction cell 208, the higher the effect of blocking the ray forming the image of the fluorescent substance 224 outside of the ray forming the image of the ultraviolet LED light source 223 is, and the difference between the light quantity distribution of the light from the ultraviolet LED light source 223 and that of the light from the fluorescent substance 224, emitted on the reaction cell 208, in the irradiation surface, is reduced. Accordingly, it is preferable that the second slit 231 is provided in the vicinity of the reaction disc 109 holding the reaction cell 208 (see FIG. 1).

The width of the opening 232 of the first slit 230 and the width of the opening 233 of the second slit 231 may be calculated from geometrical optics, or may be obtained by measurement. Further, as described above, it is preferable that both of the first slit 230 and second slit 231 are provided. However, even in a configuration where only one of the first slit 230 and second slit 231 is provided, it is possible to obtain the effect that the difference between the light quantity distribution of the light from the ultraviolet LED light source 223 and that of the light from the fluorescent substance 224 in the irradiation surface is reduced.

Note that in the above-described example, the configuration in which two slits are arranged is described, however, the preset invention is not limited to this configuration. When two or more lenses are provided between the light source and the reaction cell, slits of the respective lenses may be provided between the respective lenses. That is, two or more slits may be provided between the light source and the reaction cell.

Figure 5:
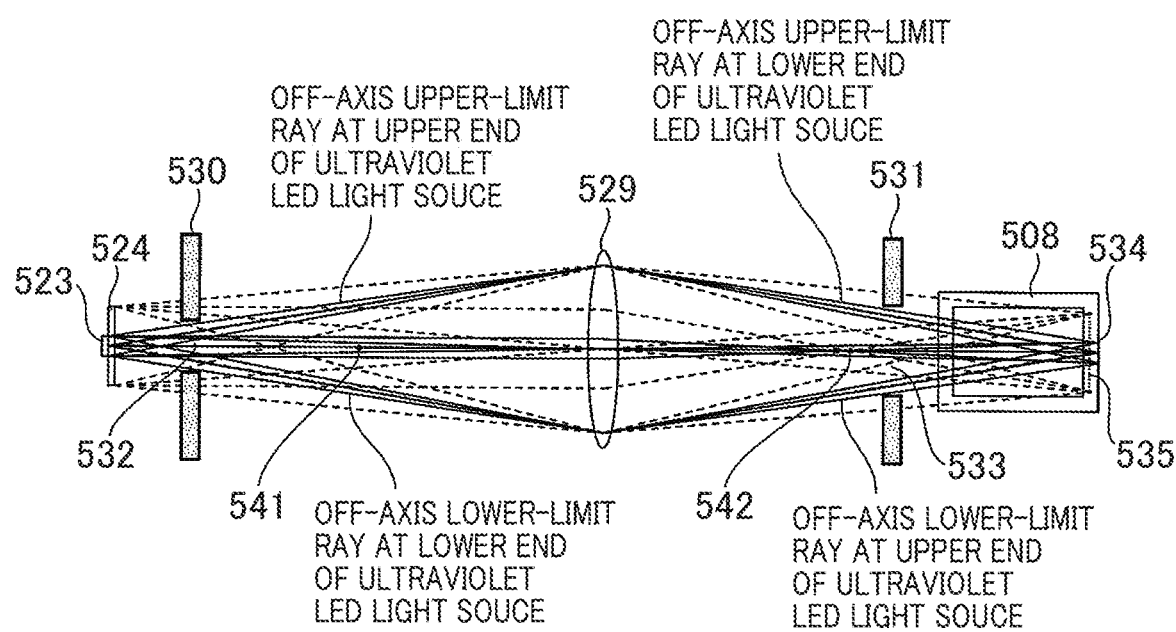
FIG. 5 is an example of an optical path diagram to obtain the width of an opening of a slit.

When the width of the opening of the above-described slit is calculated from geometrical optics, the calculation is easily performed by drawing an optical path diagram as shown in FIG. 5. FIG. 5 is an example of the optical path diagram to obtain the width of the opening of the slit.

FIG. 5 shows the optical axis, an on-axis upper limit ray, and on-axis lower-limit ray of the ultraviolet LED light source 523, with solid lines. Further, at lower end and upper end of an ultraviolet LED light source 523, a main ray, an off-axis upper-limit ray, an off-axis lower-limit ray, and a ray parallel to the optical axis, are indicated with solid lines.

On the other hand, the optical axis, an on-axis upper-limit ray, and on-axis lower-limit ray of a fluorescent substance 524, are indicated with broken lines. Further, at respective lower end and upper end of the fluorescent substance 524, a main ray, an off-axis upper-limit ray, an off-axis lower-limit ray, and a ray parallel to the optical axis are indicated with broken lines. When the first slit 530 and the second slit 531 do not exist, an image 534 of the ultraviolet LED light source 523 and an image 535 of the fluorescent substance 524 are formed about an end of a reaction cell 508.

The first slit 530 is provided between a front focal point 541 of a condenser lens 529 and the fluorescent substance 524, such that the light quantity distribution of the light from the ultraviolet LED light source 523 to be irradiated on the reaction cell 508 is relatively coincident with light quantity distribution of the light from the fluorescent substance 524 in the light irradiation surface. The width of an opening 532 of the first slit 530 is equal to or narrower than the ray width formed with the off-axis upper-limit ray at the upper end of the ultraviolet LED light source 523 and the off-axis lower-limit ray at the lower end of the ultraviolet LED light source 523 at the position of the first slit 530.

Further, the second slit 531 is provided between a rear focal point 542 of the condenser lens 529 and the reaction cell 508 such that the light quantity distribution of the light from the ultraviolet LED light source 523 to be irradiated on the reaction cell 508 is relatively coincident with light quantity distribution of the light from the fluorescent substance 524 in the light irradiation surface. The width of an opening 533 of the second slit 531 is equal to or narrower than the ray width formed with the off-axis upper-limit ray at the lower end of the ultraviolet LED light source 523 and the off-axis lower-limit ray at the upper end of the ultraviolet LED light source 523 at the position of the second slit 531.

According to the above-described configuration, the ray forming the image of the fluorescent substance 524 outside of the ray forming the image 534 of the ultraviolet LED light source 523 is blocked. The difference between the light quantity distribution of the light from the ultraviolet LED light source 523 and that of the light from the fluorescent substance 524, emitted on the reaction cell 508, in the light irradiation surface, is reduced.

The first slit 530 and the second slit 531 respectively have an effect to reduce the difference between the light quantity distribution of the light from the ultraviolet LED light source 523 and that of the light from the fluorescent substance 524, emitted on the reaction cell 508, in the light irradiation surface. However, it is effective to use these two slits 530 and 531. Further, it is more effective when the first slit 530 is closer to the fluorescent substance 524. Further, it is more effective when the second slit 531 is closer to the reaction cell 508.

In FIG. 2, the light transmitted through the reaction cell 208 is dispersed with a diffraction grating 237 in the spectroscope 236, and is received at the detector array 238 having a large number of photodetectors. The measurement wavelengths of light received at the detector array 238 are the above-described 12 wavelengths. The photodetection signals with these photodetectors are transmitted to the light quantity measuring circuit 117 in FIG. 1. The light quantity measuring circuit 117 measures the absorbance from the measured light quantity, and stores data on the absorbance in the memory 119 of the data processor 118.

The quantitative determination of the densities of ingredients included in the sample 101 is performed in accordance with the following procedure. First, the control circuit 116 cleans the reaction cell 108 by controlling the cleaning unit 114. Next, the control circuit 116 dispenses the sample 101 in the sample cups 102 into the reaction cell 108 by a certain amount by controlling the sample dispensing mechanism 110. Next, the control circuit 116 dispenses the reagent 104 in the reagent bottles 105 into the reaction cell 108 by a certain amount by controlling the reagent dispensing mechanism 111.

Upon dispensing of the respective solutions, the control circuit 116 rotates the sample disc 103, the reagent disc 106, and the reaction disc 109 by controlling drivers corresponding to the respective discs. At this time, the sample cup 102, the reagent bottle 105, and the reaction cell 108 are positioned in predetermined dispensing positions in accordance with drive timing of respectively corresponding dispensing mechanism.

Next, the control circuit 116 stirs the sample 101 and the reagent 104 dispensed in the reaction cell 108 by controlling the stirring unit 112, thus generates the reaction solution 107. With the rotation of the reaction disc 109, the reaction cell 108 containing the reaction solution 107 passes through the measuring position in which the measuring unit 113 is provided. Each time the reaction cell 108 passes through the measuring position, the measuring unit 113 measures the transmitted light quantity from the reaction solution 107. In the case of the present embodiment, the measurement time of each reaction cell 108 is about 10 minutes. The data measured with the measuring unit 113 is sequentially stored in the memory 119 via the light quantity measuring circuit 117. The reaction process data is accumulated in the memory 119.

During the accumulation of the reaction process data, the control circuit 116 may additionally dispense another reagent 104 into the reaction cell 108 by controlling the reagent dispensing mechanism 111. The reaction cell 108 in which the reagent has been dispensed is stirred with the stirring unit 112. Thereafter, the measuring unit 113 measures the transmitted light quantity for a certain period. With this configuration, the reaction process data obtained at certain time interval is stored in the memory 119.

As an LED to generate ultraviolet light having a wavelength equal to or shorter than 340 nm, an AlGaN crystal as a compound semiconductor is used. When the AlGaN crystal is used as a luminous layer, the luminous efficiency of the ultraviolet LED is low, i.e., one severalth to a few percent in comparison with the luminous efficiency of an InGaN crystal used in a luminous layer of a general white LED. The luminous layer of the AlGaN crystal has a characteristic that the greater part of put-in electric power becomes heat.

The higher the operating temperature of the LED is, and/or the longer the LED is used, the more a defect is formed in the semiconductor crystal, which leads to reduction of the light quantity. Accordingly, the life of the LED using the AlGaN crystal is often shorter than that of the LED using the InGaN crystal. In LEDs on the market, the specified value of time L70 where the light quantity is lowered to 70% is generally determined on the assumption that it is used when a package lower-surface temperature is 25° C. In the case of an LED to generate ultraviolet light having a wavelength equal to or shorter than 340 nm, L70 is equal to or longer than 10000 hours. It is known that when the temperature of use rises, L70 becomes shorter in accordance with the Arrhenius model.

In the conventional automatic analysis apparatus with a halogen lamp as a light source, a lamp house accommodating the halogen lamp is cooled and temperature-stabilized at 37±0.1° C. The ground of setting the temperature at 37±0.1° C. is that constant-temperature fluid is used to maintain the reaction cell and the reaction solution at 37±0.1° C. When the cooling and temperature-stabilizing of the LED to generate ultraviolet light having a wavelength equal to or shorter than 340 nm is performed with constant-temperature fluid (e.g., water in a constant-temperature bath) as in the case of the halogen lamp, there is a possibility that L70 becomes shorter than 10000 hours. In the following description, a configuration to avoid this inconvenience will be described.

Figure 6:
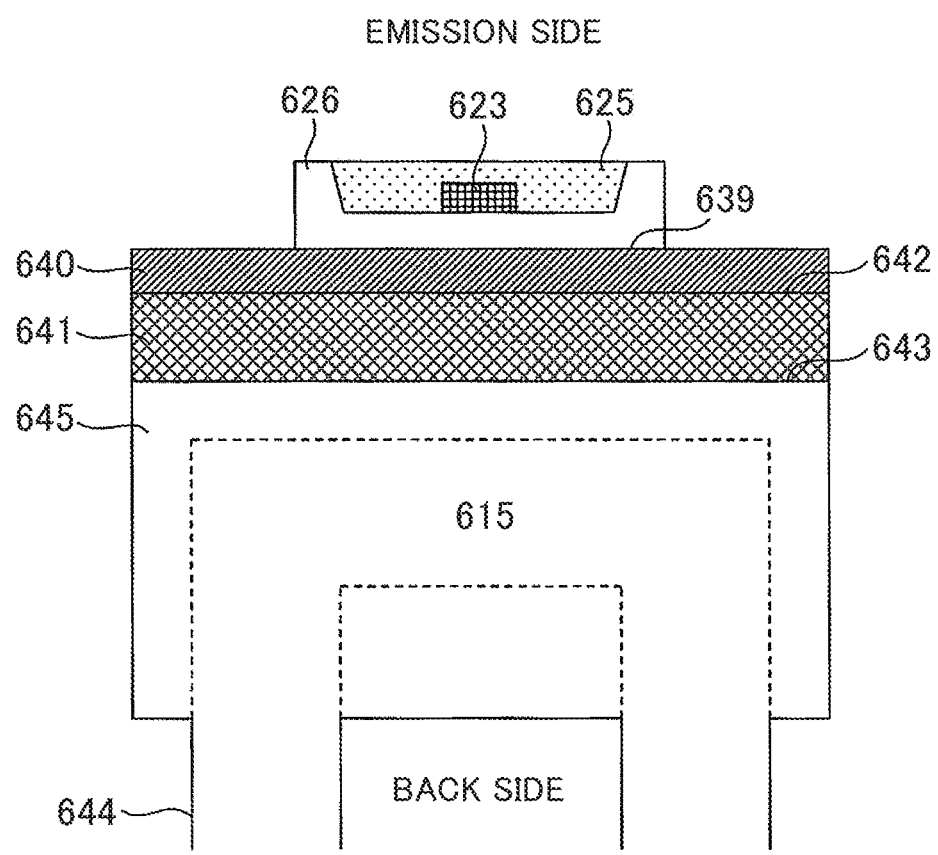
FIG. 6 is a schematic diagram showing an example of a configuration to cool and maintain constant temperature in a package lower surface of the ultraviolet LED according to the first embodiment.

FIG. 6 is a diagram showing a configuration for cooling and temperature-stabilizing the package lower surface of the ultraviolet LED. Hereinbelow, as shown in the figure, the light emission side will be referred to as "emission side", and the opposite side, "rear side". In the present embodiment, a print circuit board 640 is provided on a surface 639 on the backside of a package 626 of an ultraviolet LED 623, and a temperature stabilizer (e.g., Peltier device) 641 is provided via the print circuit board 640. A low temperature side 642 of the Peltier device 641 is connected to the print circuit board 640. A high temperature side 643 of the Peltier device 641 is connected to a metal block 645 which has a flow path 644 inside and which has high thermal conductivity. Note that the Peltier device 641 is controlled with the control circuit 116 in FIG. 1.

The print circuit board 640 has a role to supply electric power to the ultraviolet LED 623, and conduct heat generation from the ultraviolet LED 623 to the Peltier device 641. From a viewpoint of thermal conductivity, it is preferable that the print circuit board 640 is configured with ceramic-based material such as alumina, or metal-based material such as aluminum or copper.

The constant-temperature fluid 615 at 37±0.1° C. is passed through the flow path 644 in the metal block 645. With this configuration, the high temperature side 643 of the Peltier device 641 is cooled, and the surface 639 on the back side of the package 626 of the ultraviolet LED 623 is cooled and temperature-stabilized to 25±0.1° C. According to this configuration, it is possible to ensure a life of 10000 or longer hours for the ultraviolet LED 623 by cooling and temperature-stabilizing the ultraviolet LED 623 to about 25° C. or lower.

In the present embodiment, the flow path 644 is a SUS tube. The metal block 645 is made of copper. The configurations of the flow path 644 and metal block 645 are not limited to the above materials, but they may be configured with other metals, ceramics or resin, as long as corrosion resistance and thermal conductivity are ensured.

The effects of the present embodiment will be described. When the dual wavelength measuring method is to be implemented by using the conventional light source in Patent Literatures 2 to 5 as an alternative of the halogen lamp, there is a problem that it is difficult to match the optical axes and the light quantity distributions of lights from plural light sources with respect to the reaction solution. Further, the larger the number of devices such as a light source and a filter forming the light source unit is, the higher the degree of difficulty to match the above-described optical axes and the light quantity distributions is. Further, there is a problem that the larger the number of devices is, the larger the volume of the light source unit becomes.

The automatic analysis apparatus according to the present embodiment has the ultraviolet LED light source 223 to generate ultraviolet light having a center wavelength equal to or shorter than 340 nm, the fluorescent substance 224, excited with ultraviolet light to emit light, to generate light, along with the ultraviolet light from the ultraviolet LED light source, having a wavelength of 340 nm to 800 nm, the condenser lens 229, the first slit 230, the second slit 231, the reaction cell 208 to hold the reaction solution 207 in which the specimen and the reagent are mixed, and which the lights from the ultraviolet LED light source 223 and the fluorescent substance 224 enter, and the measuring unit 113 including the detector to detect light transmitted through the reaction cell 208. Further, the ultraviolet LED light source 223, the fluorescent substance 224, the condenser lens 229, the first slit 230, and the second slit 231 are provided along a straight line corresponding to the optical axis. Further, the first slit 230 is provided between the front focal point 241 of the condenser lens 229 and the fluorescent substance 224. The second slit 231 is provided between the rear focal point 242 of the condenser lens 229 and the reaction cell 208. The widths of the openings of the respective slits 230 and 231 are set to be equal to or narrower than the width of the ray forming the image of the ultraviolet LED light source 223 in the slit position.

According to this configuration, as the relative difference in optical axis and light quantity distribution between the light from the ultraviolet light source and the light from the fluorescent substance, passed through the slit, is extremely small, it is possible to regard the light from the ultraviolet light source and the light from the fluorescent substance as a single light source. The ground that the relative light quantity distributions almost correspond with each other is that the light quantity distribution of the fluorescent substance depends on the light quantity distribution of the light source in a surface corresponding to the image of the ultraviolet light source, and the same region as or smaller region than the surface corresponding to the image of the ultraviolet light source, is cut with the slit. As these lights are regarded as a single light source, in the dual wavelength measuring method, it is possible to obtain equal measurement precision and accuracy to those of the halogen lamp. Further, since an optical system for multiplexing is not necessary, it is possible to reduce the size of the light source unit to a smaller size than the conventional halogen lamp or the light source unit multiplexing plural light sources.

Second Embodiment

Figure 7:
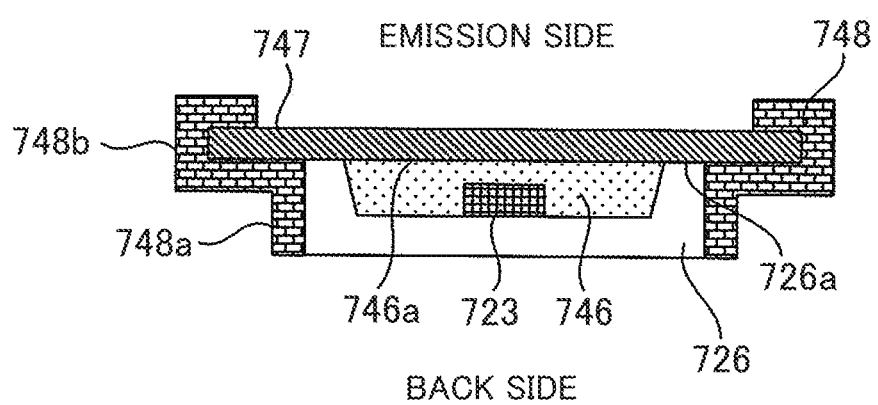
FIG. 7 is a diagram showing another example of the configurations of the ultraviolet LED light source and the fluorescent substance according to a second embodiment.

In the present embodiment, a configuration in which the members include the ultraviolet LED light source and the fluorescent substance are different will be described. FIG. 7 is a diagram showing an example of the configurations of the ultraviolet LED light source and the fluorescent substance according to a second embodiment.

The measuring unit 113 includes an ultraviolet LED light source 723, sealing resin 746, a package 726, a member 747 including a fluorescent substance, and a holding member 748. The ultraviolet LED light source 723 is accommodated in the package 726. The ultraviolet LED light source 723 is sealed with the sealing resin 746 not including fluorescent substance. The member 747 separated from the package 726 is arranged using the holding member 748 on the optical axis on which light from the ultraviolet LED light source 723 is emitted.

The holding member 748 has a first holding member 748a to hold side surfaces of the package 926, and a second holding member 748b to hold ends of the member 747. According to this configuration, it is possible to integrally hold the ultraviolet LED light source 723 and the member 747 including the fluorescent substance with the holding member 748.

The member 747 is, e.g., resin including a fluorescent substance or glass coated with the fluorescent substance. Note that the resin material used as the member 747 is, e.g., transparent silicone resin or transparent fluororesin. The glass material used as the member 747 is, preferably, quartz.

Preferably, as shown in the figure, the member 747 is provided so as to be in contact with a surface 726a on the emission side of the package 726 and a surface 746a on the emission side of the sealing resin 746. The member 747 is configured so as to be capable of being removed from the holding member 748 and changed. The other constituent elements of the automatic analysis apparatus are the same as those in the first embodiment.

According to the second embodiment, the ultraviolet LED light source 723 and the member 747 including the fluorescent substance are individually separable from the holding member 748. For example, it is possible to remove only the member 747 including the fluorescent substance from the holding member 748 and change the member 747. Especially, when the life of the member 747 including the fluorescent substance and that of the ultraviolet LED light source 723 are different, the present configuration is preferable.

Third Embodiment

Figure 8:
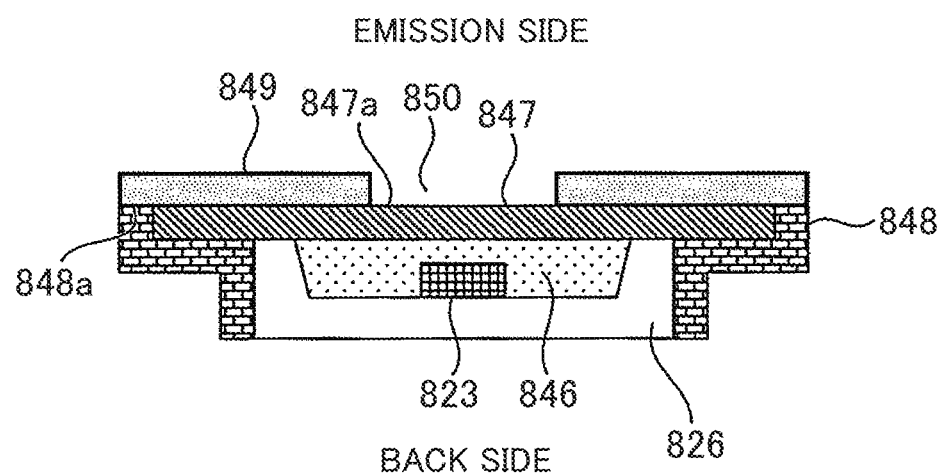
FIG. 8 is a diagram showing another example of the configurations of the ultraviolet LED light source and the fluorescent substance according to a third embodiment.

As a modification to the second embodiment, it is possible to integrate the holding member holding the resin including the fluorescent substance or the glass coated with the fluorescent substance with a slit. FIG. 8 is a diagram showing an example of the configurations of the ultraviolet LED light source, the fluorescent substance, and the slit according to a third embodiment.

An ultraviolet LED light source 823 is accommodated in a package 826. The ultraviolet LED light source 823 is sealed with sealing resin 846 not including a fluorescent substance. A member 847 separated from the package 826 is arranged using a holding member 848 on the optical axis on which light emitted from the ultraviolet LED light source 823 is emitted. As in the case of the above description, the member 847 is resin including a fluorescent substance or glass coated with the fluorescent substance. The member 847 is configured so as to be capable of being removed from the holding member 848 and changed.

A first slit 849 is integrally attached to an end 848a on the emission side of the holding member 848. It may be configured such that the first slit 849 is fixed to the holding member 848 or is removable from the holding member 848. Preferably, the first slit 849 is provided to be in contact with a surface on the emission side of the member 847 including the fluorescent substance. The width of a slit opening 850 of the first slit 849 is determined so as to satisfy the requirements of the first slit in the first embodiment.

According to the configuration of the third embodiment, the first slit 849 is provided at the position close to the fluorescent substance. Accordingly, it is possible to enhance the effect of reduction of the difference in light quantity distribution between the light from the ultraviolet LED light source 823 and the light from the member 847 including the fluorescent substance in the irradiation surface.

Fourth Embodiment

Figure 9:
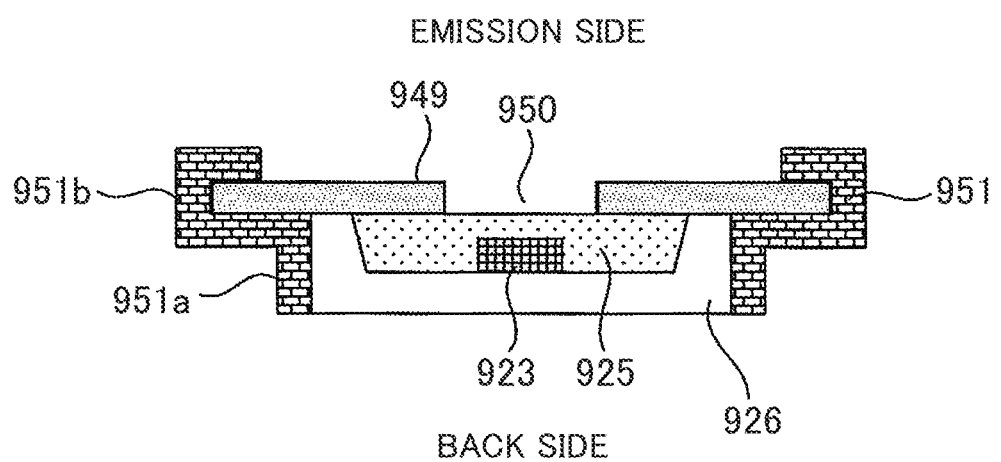
FIG. 9 is a diagram showing another example of the configurations of the ultraviolet LED light source and the fluorescent substance according to a fourth embodiment.

In the present embodiment, a configuration in which the sealing resin including the fluorescent substance and the first slit are integrally held with the holding member will be described. FIG. 9 is a diagram showing an example of the configurations of the ultraviolet LED light source, the fluorescent substance, and the slit according to a fourth embodiment.

An ultraviolet LED light source 923 is accommodated in a package 926. The ultraviolet LED light source 923 is sealed with sealing resin 925 including a fluorescent substance. A first slit 949 is provided on the optical axis of the ultraviolet LED light source 923. Preferably, the first slit 949 is arranged using a holding member 951 so as to be in contact with the sealing resin 925 including the fluorescent substance. For example, the holding member 951 has a first holding member 951a to hold side surfaces of the package 926 and a second holding member 951b to hold ends of the first slit 949. According to this configuration, the holding member 951 integrally holds the package 926 including the ultraviolet LED light source 923 and the fluorescent substance and the first slit 949. The width of a slit opening 950 of the first slit 949 is determined so as to satisfy the requirements of the first slit in the first embodiment.

According to the configuration of the fourth embodiment, the first slit 949 is provided at the position close to the fluorescent substance. Accordingly, it is possible to enhance the effect of reduction of the difference in light quantity distribution between the light from the ultraviolet LED light source 923 and the light from the fluorescent substance included in the sealing resin 925 in the irradiation surface.

Fifth Embodiment

In the first embodiment, the example of combinations of the fluorescent substances when 12 wavelengths, 340 nm, 405 nm, 450 nm, 480 nm, 505 nm, 546 nm, 570 nm, 600 nm, 660 nm, 700 nm, 750 nm, and 800 nm, used in measurement is shown. Here an example of combinations of fluorescent substances when 12 wavelengths, 340 nm, 376 nm, 415 nm, 450 nm, 480 nm, 505 nm, 546 nm, 570 nm, 600 nm, 660 nm, 700 nm, and 800 nm, are used in measurement, is shown.

When $SrB_4O_3$:Eu is used as an ultraviolet fluorescent substance, $(Sr,Mg)_2P_2O_7$:Eu, as a blue fluorescent substance, $(Ba,Ca,Mg,Sr)_{10}(PO_4)_6C_{12}$:Eu, as a cyan fluorescent substance, and $(Sr,Mg)_3(PO_4)_2$:Sn and $LiAlO_2$:Fe, as a red fluorescent substance, the emission intensity required for the above-described measurement is obtained. The combinations of the fluorescent substances are not limited to this example. It is possible to obtain a desired emission spectrum by appropriately selecting a necessary type from the fluorescent substances in the respective luminescent colors shown in Table 1.

The present invention is not limited to the above-described embodiments, but includes various modifications. The above embodiments have been described in detail for explaining the present invention, and the invention is not necessarily limited to an embodiment having all the described constituent elements. Further, a part of constituent element of an embodiment may be replaced with those of another embodiment. Further, constituent elements of an embodiment may be added to those of another embodiment. Further, it is possible to perform addition/deletion/replacement with respect to a part of constituent elements of the respective embodiments with other constituent elements.

The above-described constituent elements and functions of the data processor may be realized with software by interpreting and executing a program to realize the respective functions with a processor. The information such as a program and a file to realize the respective functions may be placed in a storage device such as a memory, a hard disk and an SSD (Solid State Drive) or a storage medium such as an IC card, an SD card and a DVD.

Further, a part or all the constituent elements of the above-described controller and the like may be realized with hardware by designing them as e.g. an integrated circuit.

In the above-described embodiments, only control lines and information lines necessary for the sake of explanation are shown, but all the control lines and information lines as a product are not necessarily shown. All the constituent elements may be mutually connected.

LIST OF REFERENCE SIGNS

101 . . . sample
102 . . . sample cup
103 . . . sample disc
104 . . . reagent
105 . . . reagent bottle
106 . . . reagent disc
107 . . . reaction solution
108 . . . reaction cell
109 . . . reaction disc
110 . . . sample dispensing mechanism
111 . . . reagent dispensing mechanism
112 . . . stirring unit
113 . . . measuring unit
114 . . . cleaning unit
115 . . . constant-temperature fluid
116 . . . control circuit
117 . . . light quantity measuring circuit
118 . . . data processor
119 . . . memory
120 . . . analyzer
121 . . . input unit
122 . . . output unit
207 . . . reaction solution
208 . . . reaction cell
223 . . . ultraviolet LED light source
224 . . . fluorescent substance
229 . . . condenser lens
230 . . . first slit
231 . . . second slit
236 . . . spectroscope
237 . . . diffraction grating
238 . . . detector array

The invention claimed is:

1. An automatic analysis apparatus comprising:
a light source that generates light having a center wavelength equal to or shorter than 340 nm;
a fluorescent substance that is excited with the light of the light source to emit light, and that generates light having a wavelength of 340 nm to 800 nm, together with transmitted light from the light source;
a condenser lens;
a first slit;
a second slit;
a reaction cell that holds a reaction solution in which a specimen and a reagent are mixed, and both the light from the light source and the light from the fluorescent substance enter the reaction cell; and
a detector that detects light transmitted through the reaction cell,
wherein the light source, the fluorescent substance, the condenser lens, the first slit and the second slit are provided along a straight line corresponding to an optical axis,
wherein the first slit is provided between a front focal point of the condenser lens and the fluorescent substance, and the second slit is provided between a rear focal point of the condenser lens and the reaction cell,
wherein the width of an opening of the first slit is equal to or narrower than the width of a ray forming an image of the light source at the position of the first slit, and
wherein the width of an opening of the second slit is equal to or narrower than the width of a ray forming an image of the light source at the position of the second slit.

2. The automatic analysis apparatus according to claim 1, wherein the light source is sealed with resin including the fluorescent substance.

3. The automatic analysis apparatus according to claim 2, further comprising a holding member that holds the light source sealed with the resin and the first slit,
wherein the first slit is provided so as to be in contact with the resin.

4. The automatic analysis apparatus according to claim 1, further comprising a member including the fluorescent substance,
wherein the member including the fluorescent substance is resin including the fluorescent substance or glass coated with the fluorescent substance, and is provided on an optical axis of the light source.

5. The automatic analysis apparatus according to claim 4, further comprising a holding member that holds the member including the fluorescent substance and the light source,
wherein the member including the fluorescent substance and the light source are configured individually separable from the holding member.

6. The automatic analysis apparatus according to claim 5, wherein the holding member further holds the first slit, and
wherein the first slit is provided so as to be in contact with the member including the fluorescent substance.

7. The automatic analysis apparatus according to claim 1, wherein the light source is a light emitting diode, and
wherein the apparatus further comprises a temperature stabilizer that cools and temperature-stabilizes the light source to 25° C. or less.

8. The automatic analysis apparatus according to claim 7, wherein the temperature stabilizer includes a Peltier device.

* * * * *